Sept. 28, 1965   J. R. COFFING   3,208,426
ATTITUDE INDICATOR
Filed Dec. 9, 1963   4 Sheets-Sheet 1

Inventor
James R. Coffing
Jack E. Dominik
Attorneys

Sept. 28, 1965  J. R. COFFING  3,208,426
ATTITUDE INDICATOR
Filed Dec. 9, 1963  4 Sheets-Sheet 2
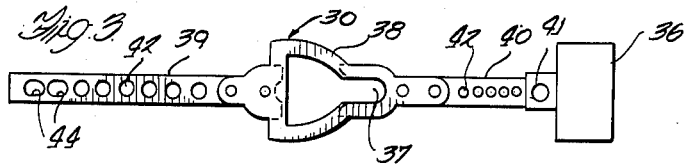
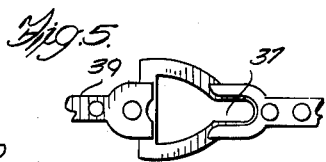
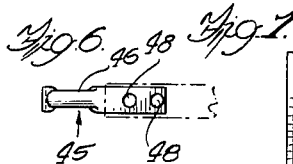
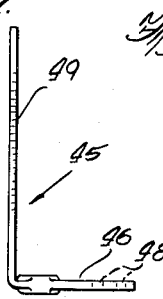
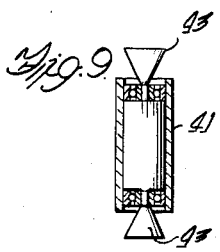
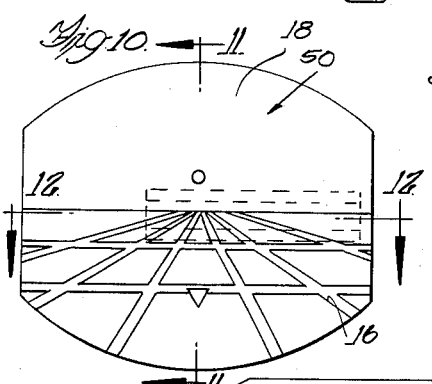
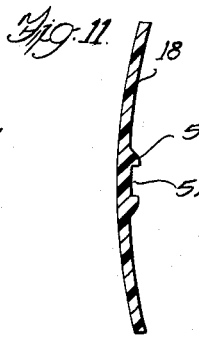
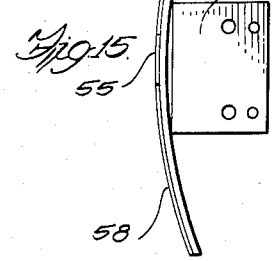
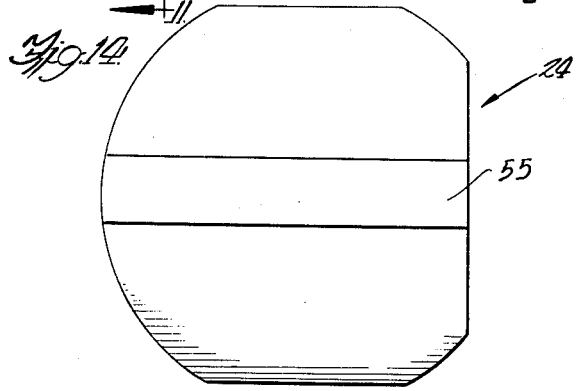
Inventor
James R. Coffing

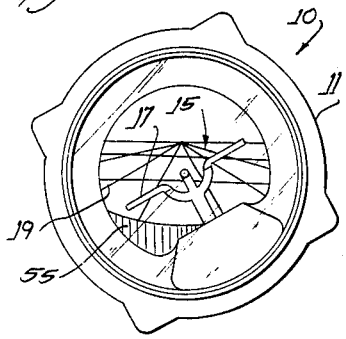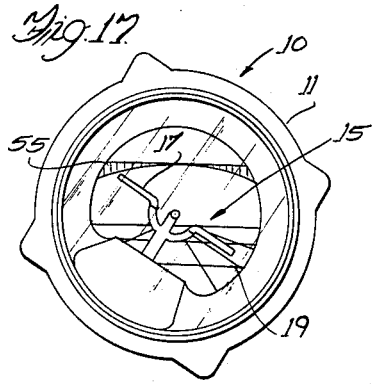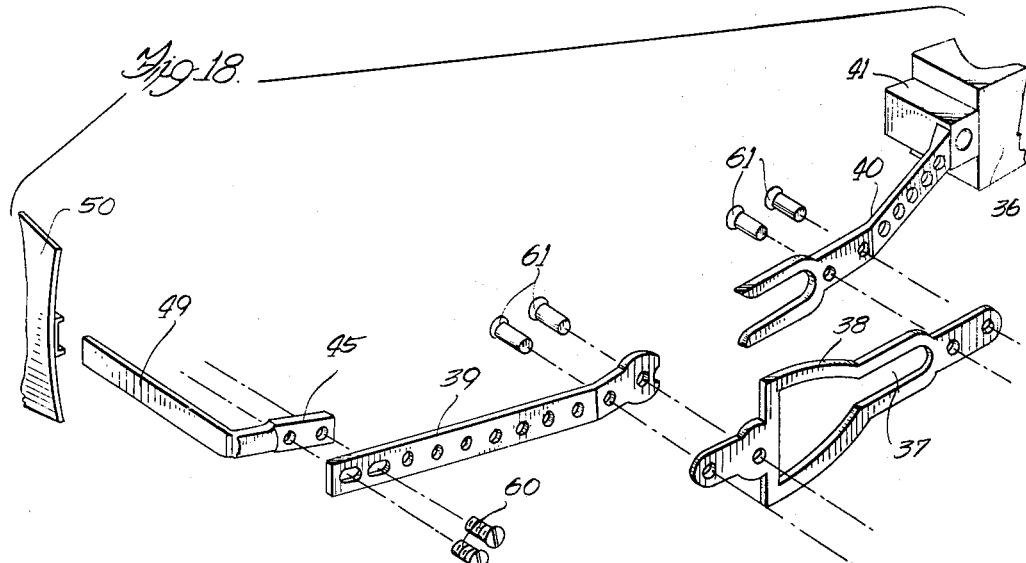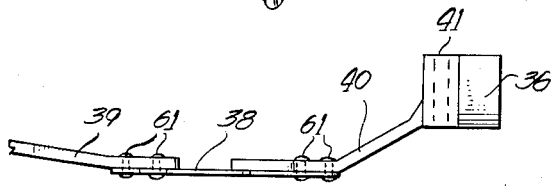

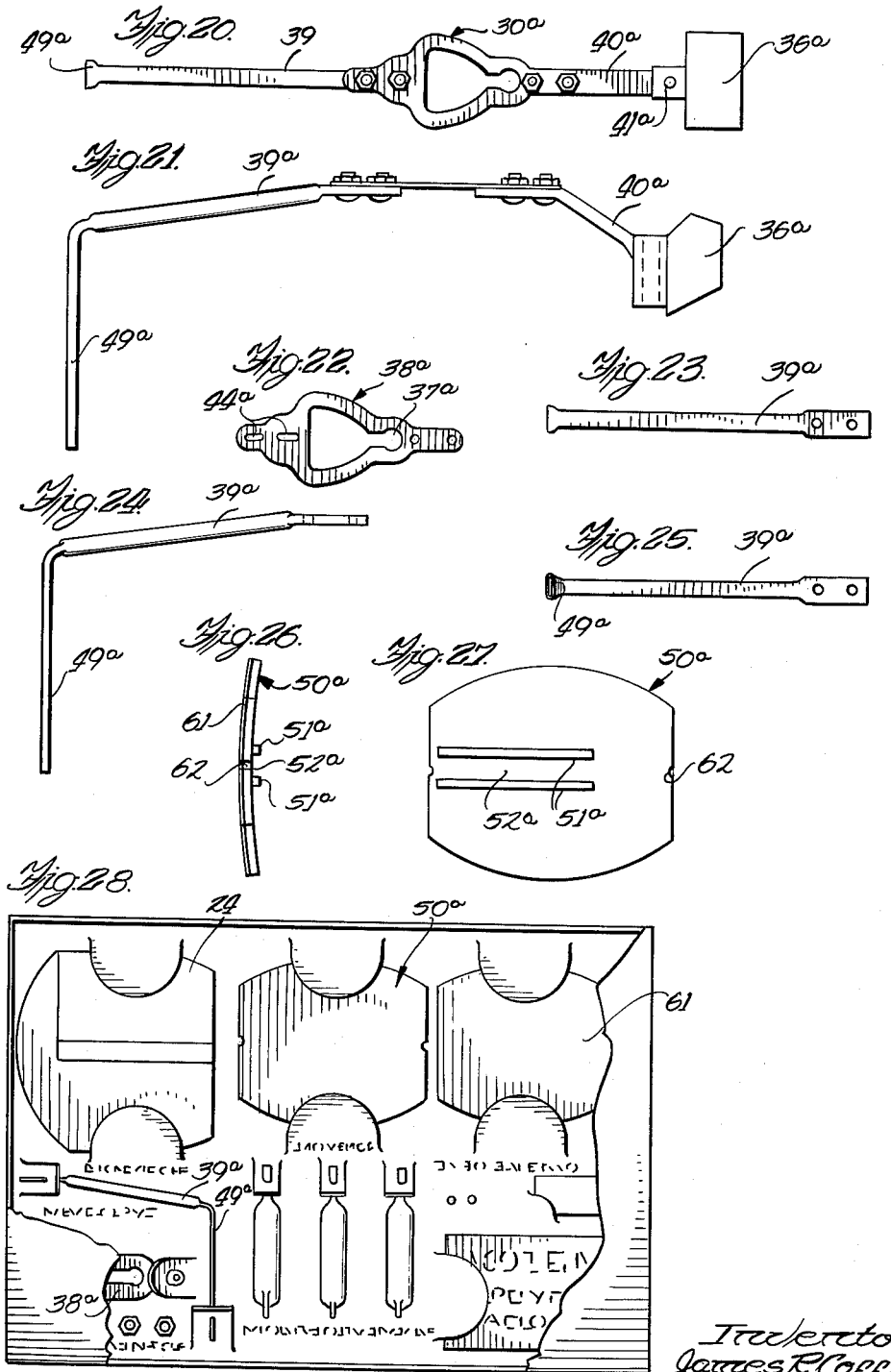

United States Patent Office 3,208,426
Patented Sept. 28, 1965

3,208,426
ATTITUDE INDICATOR
James R. Coffing, R.R. 2, Box 224, Covington, Ind.
Filed Dec. 9, 1963, Ser. No. 233,186
4 Claims. (Cl. 116—129)

This application constitutes a continuation-inpart of my prior copending application Serial No. 91,298, filed February 20, 1961 and Serial No. 127,200, filed July 27, 1961, now Patent No. 3,181,249.

The subject invention relates to aircraft instrumentation and more particularly to an attitude type indicator better known as an artificial horizon.

The artificial horizon which has been adopted as a standard by the industry for the last twenty to thirty years employs a silhouette of an airplane and a single bar in order to create an impression of the relationship between the host aircraft and the horizon. In such an instrument the host aircraft remains stationary in the instument, and the horizon maintains a level position as motiviated by an associated gyroscope, normally vacuum driven in the host instrument. Such instruments are subject to ambiguous readings by the unskilled pilot, and with the advent of increased business flying more and more pilots are entering into the overcast without extensive experience in following the instruments. Indeed, many such pilots inadvertently are caught in the overcast, and with only a few hours of experience have met with fatal results on becoming confused and subject to vertigo in the course of attempting to fly without reference to an actual horizon.

In view of the foregoing, it is an object of the present invention to provide an attitude indicator which more faithfully duplicates the external scene, and therefore will cause the pilot to react in a more natural fashion to the display of the relationship between the host aircraft and the horizon.

Another object of the present invention is to provide an attitude indicator in which the horizon is amplified in its appearance by means of lines which converge at a vanishing point, thereby giving the effect of flying over an open flat field with several section lines or fences, much like the new pilot is accustomed to seeing throughout his journeys in good weather. A related advantage is achieved through such a configuration in that the transition time between visual flight and instrument flight is substantially reduced.

Still a further object of the present invention is to provide an attitude indicator which substantially reduces the fatigue of the pilot, and which is further color-coded in order to provide a more striking difference between the terrain reference and the sky reference which meet at the artificial horizon. Additional color-coding is provided to achieve a striking warning of extreme attitudes.

Still a further object of the present invention is to furnish an adaptation for a standard well-accepted artificial horizon which will provide all of the foregoing advantages, and do so in a construction which is inherently inexpensive to fabricate, manufacture, and install as a modification to the host unit.

A further and more detailed object of the invention is to furnish an attitude indicator in the conversion form as indicated above which is rugged, simple, and highly durable in operation, and induces no additional operating difficulties to the host instrument above and beyond those normally experienced with a well-prefected and tried instrument.

Still another object of the present invention is to provide a conversion from an existing commercial attitude indicator for a pictorial flat-faced presentation in which the weight of the pointer bar and movable mask is held to the irreducible minimum thereby accomplishing the two-fold purpose of reducing vibration and bearing wear and additionally reducing the size of the necessary counterweight which makes room at the rear portion of the instrument for accommodating the various pick-off devices employed in auto-pilots of the pneumatic and electrical character.

Even another advantage of the present invention relates to the method of attaching the movable mask to the pointer bar in such a manner that precise adjustment in its balancing can be achieved without sacrificing weight, or involving extensive time and consequently increased cost in the modification.

Further objects and advantages of the present invention will become apparent as the following description of an illustrative embodiment proceeds, taken in conjunction with the accompanying drawings which illustrate one commercial embodiment of the unit, in which:

FIG. 3 is a front elevation of the pointer bar assembly

FIG. 4 is a top view of the pointer bar assembly illustrating diagrammatically its suspension for pivoting.

FIG. 5 is a rear elevation, partially enlarged and partially broken of the pointer bar assembly connection to the pointer bar.

FIG. 6 is a front elevation partially broken and in an enlarged scale of the connection between the pointer bar connecting rod and the attachment to the movable mask.

FIG. 7 is a top view of the pointer bar connecting rod and movable mask connection as shown in FIG. 6.

FIG. 8 is a side elevation of the pointer bar connecting rod as shown in FIG. 7.

FIG. 9 is a transverse sectional view of the pointer bar bearing illustrating in enlarged scale the relationship between the bearing and its suspension points.

FIG. 10 is a front elevation, partially diagrammatic, of the movable mask.

FIG. 11 is a transverse sectional view taken along section line 11—11 of FIG. 10 of the movable mask.

FIG. 12 is a top view of a cross section of the movable mask.

FIG. 13 is an enlarged, partially broken, partially sectioned view showing the assembled relationship between the movable mask and the movable mask connection.

FIG. 14 is a front elevation of the permanent mask illustrating the orientation of the contrasting colored warning band.

FIG. 15 is an end view of the permanent mask assembly taken from the right of FIG. 14.

FIG. 16 is a front elevation of the assembled unit showing diagrammatically how the warning band displays itself when an extreme attitude of dive is experienced.

FIG. 17 is a front elevation diagrammatically illustrating how the warning band appears when an extreme attitude of climb and bank together are experienced.

FIG. 18 is a partially perspective, partially broken, exploded view of the pointer bar connection to the movable mask illustrating the key components relating thereto.

FIG. 19 is a top view of the pointer bar connector and assembly shown in FIG. 18 to contrast the assembled relationship to the exploded view.

FIG. 20 is a front elevation of the pointer bar assembly of a modified form of the present invention.

FIG. 21 is a bottom view of the pointer bar assembly shown in FIG. 20 above.

FIG. 22 is a front elevation of the side plate shown at the center of FIG. 20 above.

FIG. 23 is a front elevation of the forward portion of the pointer bar shown in FIG. 20 above.

FIG. 24 is a bottom view of the pointer bar modification element.

FIG. 25 is a rear view of the pointer bar modification as shown in FIG. 23.

FIG. 26 is an end view of a modified construction of a polystyrene lightweight movable mask.

FIG. 27 is a rear elevation of the movable mask shown in FIG. 26 taken from the right hand portion thereof.

FIG. 28 is a top view of a kit containing all of the elements necessary to connect an artificial horizon of the conventional type to that illustrative of the invention.

As was indicated above, the present invention contemplates a very graphic demonstration of the attitude of the host aircraft for reading by the pilot. The invention stems from the adoption of a movable mask rather than a single horizon bar in an artificial horizon. This presents an unambiguous relationship between the sky and the earth. Additionally, by employing appropriately orienting grid lines, a terrain mask on the front portion of the movable mask is provided which gives a vanishing point and therefore a clear-cut representation of the earth as understood diagrammatically by most persons. In addition, the various lines to the vanishing point are positioned at such angles so that the pilot will have an instantaneous and direct reading of his angle of bank, and additionally of his angle of climb or dive with relation to the various power settings, and appropriate attitudes of the aircraft as determined experimentally by visual flight. By utilizing a unique physical relationship between the movable mask and the permanent mask, and further by employing a brightly contrasting color band on the permanent mask, a warning flag on the fixed mask is provided which immediately displays itself when excessive pitch is encountered in either extreme attitudes of climb or dive. For example, it can be so proportioned that when the climb or dive exceeds 25° the brightly contrasted warning flag appears. In addition, the horizontal grid lines serve as descent pitch guide indicia, and climb is coordinated with a dot placed above the vanishing point in order to graduate the attitudes of climb and dive, between the extreme attitudes which are disclosed by the warning flag. The entire unit is so assembled and designed that it can be placed onto an existing artificial horizon with an irreducible minimum of structural change, and employing inherently all of the time-tested and safe durable features of the existing artificial horizon.

Figure 1:
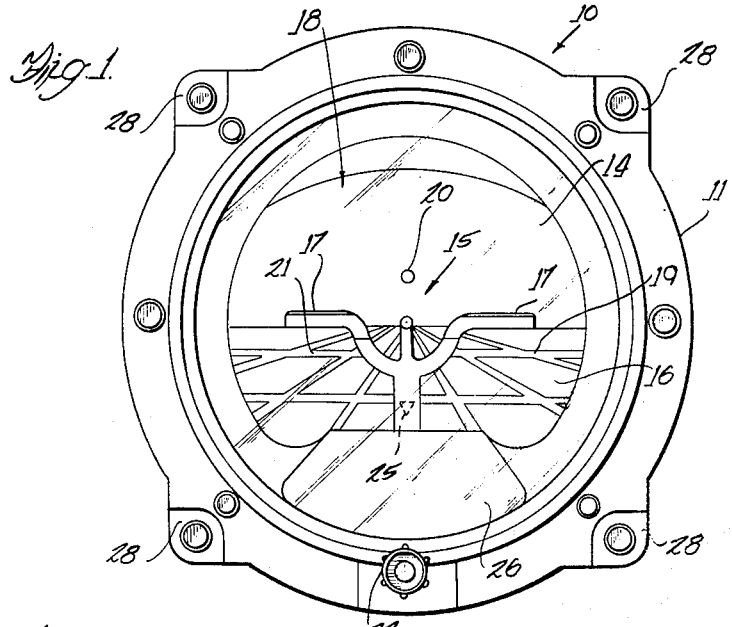
FIG. 1 is a front elevation of the attitude indicator modified with an adaptation illustrative of the present invention.
Figure 2:
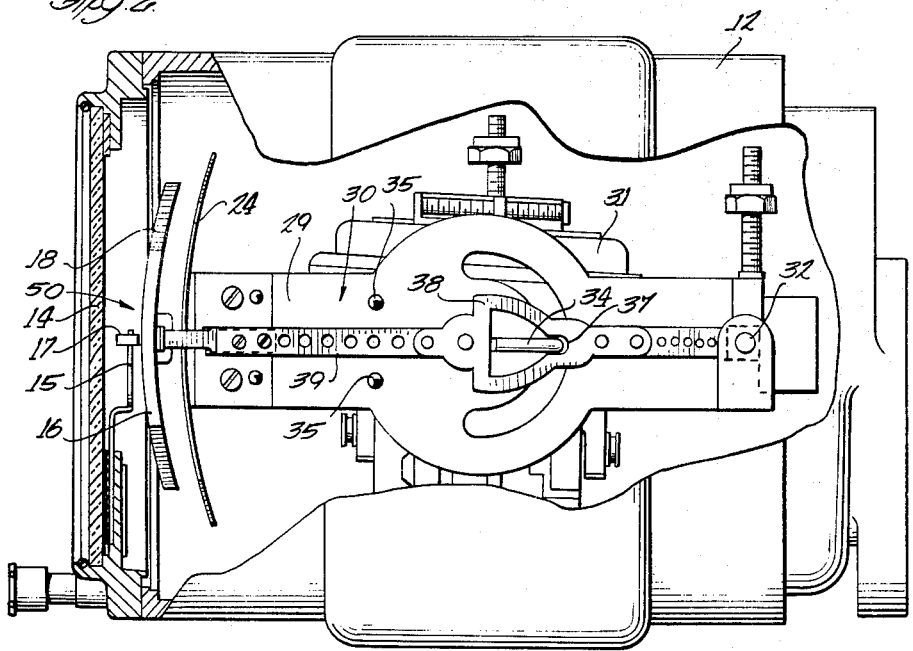
FIG. 2 is a side elevation of the attitude indicator shown in FIG. 1, partially broken, and partially sectioned in order to reveal the interior and significant operative elements thereof.

Referring now to FIG. 1, it will be seen that the basic artificial horizon 10 appears as normally anticipated. A bezel 11 is provided and is attached to the housing 12, as shown in FIG. 2. A display window 14 in the front portion of the bezel 11 reveals a miniature aircraft symbol 15. The miniature aircraft symbol 15 employs the standard configuration to which most pilots are accustomed, except that, as shown alternatively in FIG. 2, there is some depth to the unit giving a partially 3-dimensional appearance. Additionally, the color arrangement of the miniature aircraft by providing bands 17 of brightly colored contrasting glowing paint renders the unit exceedingly easy to read during daylight and night operation.

As will be seen, a sky reference 18 appears on the upper portion of the movable mask, above the grid lines 19 which are oriented at 15°, 30° and 60° relationships with the horizontal. All of the vertical grid lines intersect at a central vanishing point.

It will be further noted that the climb pitch guide reference 20 is oriented approximately 10° above the vanishing point so that the pilot, upon commencing his climb, can judge his power setting and attitude without continuous reference to the rate of climb indicator.

Similarly, descent pitch guide reference lines at approximately 10° and 25° are provided as indicated by reference numeral 21. The grid system which is revealed by a combination of the grid lines 19 and the descent pitch guide reference 21 is very similar to that experienced by the pilot in flying over open fields where there is a normal section line fencing or road network, but with the additional advantage of each of the lines having a significant relationship to the control of the attitude of the aircraft.

The miniature aircraft is adjusted vertically with the pitch adjustment mechanism 22. Referring now to FIG. 2, it will be seen that a fixed mask 24 which is stabilized on the gimbal 29 is provided to have a fixed relationship with the host aircraft. As the aircraft rolls substantially, the 90° roll indicia 25, as shown in FIG. 1, appears at a mid-point in the grid system, as will become hereinafter more fully apparent.

A pointer bar assembly 30 is attached to the gimbal 29 and pivots about the pointer bar arm assembly pivot 32. The pivot 32 is a point type pivot about a bearing and has been designed for the irreducible minimum of friction in operation.

The pointer bar activator shaft 34 is fixed to the gyroscope 31, and nestles within the pointer bar activator slot 37 to move the pointer bar vertically and thereby coordinate the motion of the movable mask with regard to the miniature aircraft symbol.

In order to limit the amount of travel of the movable mask, a pair of pointer stop pins 35 are provided in the gimbal 29 to limit travel, the pointer bar activator shaft 34 then moving within the pointer bar side plate 38 through the open area as indicated.

Referring now to FIG. 3, it will be seen that a pointer bar connecting rod line 39 has been provided to form one portion of the pointer bar assembly 30, along with the pointer bar bearing arm 40 which in turn attaches to the pointer bar bearing 41. As shown in FIGS. 4 and 9, the pointer bar bearing 41 is received at both ends by means of conical pointer bar assembly pivots 43. A plurality of weight relief holes 42 are provided along the pointer bar connecting rod 39 and the pointer bar bearing arm 40. On the other hand, in order to adequately counter-balance the unit for frictionless pivotal motion, a pointer bar assembly counter-weight 36 is provided at the rear end portion of the pointer bar bearing arm 40.

Connecting rod adjustable mounting holes 44 are provided at the forward portion of the pointer bar connecting rod line 39, and are elongate in their configuration in order to provide for adjustment with the connecting rod 45, as shown in FIG. 6.

Referring now to FIGS. 6, 7, and 8, it will be seen that the connecting rod 45 has a connecting rod attachment arm 46 and a connecting rod set of attachment holes 48. A movable mask connection 49 is provided at one end of the connecting rod 45 and substantially transverse to the connecting rod attachment 46. As will be seen in FIGS. 10, 11, and 13, the connecting rod attachment arm 46 and the movable mask connection 49 are attached to the movable mask 50 by means of their nestling within the movable mask mounting boss 51 and its associated movable mask mounting slot 52. As indicated in FIG. 13, a permanent cement 54 is provided in order to furnish a bond between the movable mask connection 49 and the mounting boss 51, and the movable mask mounting slot 52.

As best shown in FIGS. 14 and 15, the permanent mask 24 is provided with an extreme attitude warning flag or band 55, preferably painted with a daylight fluorescent orange or red material. This band at the mid-portion of the fixed mask 24 is preferably flanked by a blue color above, and a black color below. The fixed mask, as indicated above, is secured to the gimbal 29 as shown in FIG. 2 by means of the fixed mask mounting bracket 59. FIGS. 16 and 17 illustrate approximately how the extreme attitude warning band 55 appears in extreme attitudes of dive and climb respectively.

Referring now to FIG. 18, it will be seen that by merely employing the movable mask 50 in its connected relationship with the movable mask connection 49 and the connecting rod 45, by means of the fastening screws 60, the assembly of the movable mask to the connecting rod assembly is virtually completed. Sets of rivets 61 are employed to attach the pointer bar side plate 38 to the pointer bar connecting rod 39 and the pointer bar bearing arm 40. The pointer bar bearing 41 and its associated counter-weight 36 complete the assembly. Therefore there appear to be but five parts required for the assembly, in addition to the modification of the miniature aircraft where desired in order to produce a depth effect of the miniature aircraft as indicated in the side view thereof in FIG. 2. The entire assembly is inexpensive to manufacture and fabricate, and admits of ready adjustment for modification by field personnel at accepted instrument repair stations rather than requiring complex factory modification to achieve the advantage of the invention by means of modification of existing equipment. The bright color bands 17 on top of the miniature aircraft 15, particularly when the miniature aircraft has some depth, permit the pilot to readily spot the position of his miniature aircraft, and compare the same with the grid reference on the movable mask as well as the warning bands where indicated in extreme attitude.

*Movable mask*

In accordance with a more recent embodiment of the present invention, a movable mask with the configuration shown in FIGS. 26 and 27 is employed. This movable mask 50A is molded from an expandable polystyrene. The polystyrene beads are weighed prior to molding, and then placed in a mold where they are expanded and fused by steam to form a strong and extremely lightweight plastic foam with a discrete, close cell structure possessing a smooth skin. The exact weight of the parts is held within a tolerance of + or −.1 gram, and the total weight of the movable mask is .9 gram.

The bead size employed in making the expandable polystyrene is known in the trade as Pelaspan 8 or QX4362.2M Pelaspan manufactured by Dow Chemical Company. Ordinary bead sizes in accordance with U.S. seceen size are OM10 through 40. Most Pelaspan material for usual usage is molded in a density of two pounds per cubic foot which gives a compression strength of 30 p.s.i. and a tensile strength of 50 p.s.i. In the movable mask 50A, however, the special size Pelaspan used is expanded to approximately two and one-half pounds per cubic foot and compressed in the mold giving it a density considerably higher than the molded piece, and at the same time light enough to fall within the weight tolerance required. If the ordinary density is employed, the movable mask is disadvantageous in that the weight is lighter than that required, but more importantly, it does not have the strength and the smooth facing which permits the decal pattern to be attached thereto in an acceptable commercial presentation. The tensile strength which is achieved by this additional density and compression is also considerably higher than the 50 p.s.i. While the absorptive qualities of the material is somewhat reduced by the additional compression, it is not reduced below that level to render it perfectly compatible with the glue or fastening material employed to attach the same to the pointer bar 49A. In addition, a dampening of vibration in the frequency range varying between 12,000 and 18,000 revolutions per minute as induced by the rotor or motor of the host gyroscope is also observed with this type material.

Two types of vibration are imposed upon the movable mask 50A when installed in aircraft. The first vibration which is encountered is the initial erection of the gyro, and this induces a flutter which starts when the gyro is turning a few hundred revolutions per minute and continues until the gyroscope reaches sufficient revolutions per minute to remain stable. This initial flutter is of generally short duration, mostly less than thirty seconds which is induced while the aircraft is warming up. The cellular structure of the movable mask 50A is of such durability anf resonant characteristics as to permit flexing and to set up and interference against rhythmic vibrations which would occur during this period of time. An additional vibration can occur when the aircraft engines, particularly in a twin engine aircraft, induce vibrations in the instrument panel itself. Here again, the sound deadening characteristics of the lightweight material on the mask tend to dampen out any induced vibration which might otherwise occur in a metal movable mask, or other solid movable mask responsive to the exterior vibrations.

Metal movable masks do not have this quality because of their non-absorptive material and lack of resilience. Indeed, such qualities and characteristics of metal movable masks could actually enhance or magnify the vibration much as a sounding board. In addition, experience has shown that since there is not room to properly form a mask for removing and attaching to the pointer bar because of weight factor limitations, an aluminum alloy mask when subjected to the flutter and sonic vibrations will make a permanent bend thus permitting it to touch against the fixed mask or frame of the gyro in various configurations which can result in undesirable precession.

In attaching the movable mask 50A to the pointer bar movable mask connection 49A, a method is employed which is implemented by the particular construction of the movable mask 50A. The movable mask mounting slot 52A, as shown in FIGS. 26 and 27, is filled with a rubber cement, and then the movable mask connection 49A is slipped into position. The rubber cement which is employed approximates the same weight that will appear within the slot 52A defined by the flanking boss 51A when ultimately assembled. This permits very accurate balancing of the movable mask along with the pointer bar arm assembly 30A by adjusting the pointer bar assembly counterweight 36A. Adjustment can be made to a very fine degree in this manner, but thereafter the movable mask 50A must be removed from the pointer bar assmbly 30A in order that the entire gyro assembly mechanism can be inserted within the housing 12. The rubber cement is then removed after physically separating the movable mask 30A from the metal assembly, and an ordinary art gum eraser will remove it from the slot 52A. Then the entire gyro assembly is inserted within the housing 12, the movable mask 50A is reattached to the pointer bar assembly, whereupon the unit can be subsequently fixed permanently with an epoxy resin.

The epoxy resin used is sold under the trademark Eccobond 26 manufactured by the Emerson & Cuming Corporation of Canton, Massachusetts. The epoxy and hardener are mixed in equal parts, and applied with a small wooden applicator cleansed to eliminate any foreign material. An applicator such as a small wooden stick, heavy toothpick, and the like is suitable. This resilient epoxy polymer exhibits permanent adhesion to metal and plastics. The channel 52A on the moving mask 50A is filled approximately one-half full prior to pressing the mask into position. The excess epoxy in the channel will then move up around the pointer bar 49A to overlap the edges and complete the bond between the metal and the polystyrene of the movable mask 50A, and additionally interlock the same at the overlap. It has been observed that with the pressed polystyrene, the epoxy resin penemodate the auto-pilots pickoffs which have been the subject of the modification for the instant design. Additionally, the movable mask as described reduces vibration, and increases the life of the modified artificial horizon to that which can normally be expected from any unmodified artificial horizon. Finally, the color presentation as indicated provides a steady and readily readable presentation of the attitude of the aircraft under good lighting conditions in the daytime, or artificial cockpit lighting conditions at night.

A very important commercial advantage of the invention defined herein is that the entire construction can be assembled in kit form (see FIG. 28) to use for the modification of most artificial horizons currently used in aircrafts throughout the world. Such a kit, as commercially made available, includes the pointer bar, the pointer bar side plate, side plate screws and nuts for attachment, a movable mask, a movable mask decal, a fixed mask decal, and stop pins for the pointer bar. Additionally, the kit supplies various resins employed for the attachment of the pointer bar to the movable mask, and certain paint elements that may be used to outline the wings on the host artificial horizon.

Such kits may be assembled in small form, and mailed to instrument repair stations throughout the world, and readily stocked by instrument repair stations for the modification of existing artificial horizons when they are brought in for ordinary repairs. The modification can be accomplished in approximately two to three man hours after the operator becomes proficient in this modification. Thus the host aircraft is readily provided with an entirely new concept in the presentation of attitude, the results of which are to decrease the time required for transition from visual to instrument flight. The pilot is further provided with instantaneous readings of incremental pitch and bank without reference to any peripheral indices. In addition, emergency markings and flag warnings may be provided with the fixed mask in coordination with the movable mask to further enhance the value of the instrument to the aircraft pilot.

Although particular embodiments of the invention have been shown and described in full here, there is no intention to thereby limit the invention to the details of such embodiments. On the contrary, the intention is to cover all modifications, alternative embodiments, usages and equivalents of the attitude indicator or artificial horizon as fall within the spirit and scope of the invention, specification and appended claims.

What is claimed is:

1. For use in an artificial horizon, said artificial horizon being of the class presenting a flat faced pictorial display of a movable mask having terrain reference and sky reference, a pointer bar and movable mask assembly comprising, in combination: a pointer bar assembly including a pointer bar arm which is formed from tubular aluminum material, a pointer bar side plate secured to said pointer bar arm, means in said side plate defining a central open area, a keyhole shaped pointer bar activator slot defined in said side plate, a connecting arm, a pointer bar bearing rearwardly positioned from said connecting arm, and a counterweight attached to the rear portion of the pointer bar assembly and behind the pivot point thereof; and a movable mask assembly formed of a molded porous lightweight expandable polystyrene, the mold form providing for a pair of parallel ribs at the rear portion thereof, said ribs defining a slot therebetween to accommodate said pointer bar arm, and flanking notches at the edge portion of said movable mask to define an orientation for the horizon line of a face mask to be placed on the forward portion of said movable mask.

2. For use in an artificial horizon, said artificial horizon being of the class presenting a flat faced pictorial display of a movable mask having terrain reference and sky reference, a pointer bar and movable mask assembly comprising, in combination: a pointer bar assembly including a pointer bar arm which is formed from tubular aluminum material and which has a forward portion swaged and bent at an angle to provide a movable mask attachment substantially perpendicular with the plane of the movement, a pointer bar side plate longitudinally adjustably secured to said pointer bar arm, means in said side plate defining a central open area, a keyhole shaped pointer bar activator slot defined in said side plate, a connecting arm, a pointer bar bearing rearwardly positioned from said connecting arm, and a counterweight attached to the rear portion of the pointer bar assembly and behind the pivot point thereof; and a movable mask assembly formed of a molded porous lightweight expandable polystyrene, the mold form providing for a pair of parallel ribs at the rear portion thereof, said ribs defining a slot therebetween to accommodate said pointer bar arm, and flanking notches at the edge portion of said movable mask to define an orientation for the horizon line of a face mask to be placed on the forward portion of said movable mask.

3. For use in an artificial horizon, said artificial horizon being of the class presenting a flat faced pictorial display of a movable mask having terrain reference and sky reference, a pointer bar and movable mask assembly comprising, in combination: a pointer bar assembly including a pointer bar arm which is formed from tubular aluminum material and which has a forward portion swaged and bent at an angle to provide a movable mask attachment substantially perpendicular with the plane of the movement, a pointer bar side plate longitudinally adjustably secured to said pointer bar arm, means in said side plate defining a central open area, a keyhole shaped pointer bar activator slot defined in said side plate, a connecting arm, a pointer bar bearing rearwardly positioned from said connecting arm, and a counterweight attached to the rear portion of the pointer bar assembly and behind the pivot point thereof; a movable mask assembly having a cylindrical segmental configuration and being formed of a molded porous lightweight expandable polystyrene, the mold form providing for a pair of parallel ribs at the rear portion thereof extending more than halfway across the rear portion of said mask, said ribs defining a slot therebetween to accommodate said pointer bar arm, and flanking notches at the edge portion of said movable mask to define an orientation for the horizon line of a face mask to be placed on the forward portion of said movable mask.

4. For use in an artificial horizon, said artificial horizon being of the class presenting a flat faced pictorial display of a movable mask having terrain reference and sky reference, a pointer bar and movable mask assembly comprising, in combination: a pointer bar assembly including a pointer bar arm which is formed from tubular aluminum material and which has a forward portion swaged and bent at an angle to provide a movable mask attachment substantially perpendicular with the plane of the movement, a pointer bar side plate longitudinally adjustably secured to said pointer bar arm, means in said side plate defining a central open area, a keyhole shaped pointer bar activator slot defined in said side plate, a connecting arm, a pointer bar bearing rearwardly positioned from said connecting arm, a counterweight immediately to the rear portion of said pointer arm bearing, said counterweight having a configuration modified to a size permitting autopilot pickoffs in the host artificial horizon; and a movable mask assembly having a cylindrical segmental configuration and being formed of a molded porous lightweight expandable polystyrene, the mold form providing for a pair of parallel ribs at the rear portion thereof extending more than halfway across the rear portion of said mask, said ribs defining a slot therebetween to accommodate said pointer bar arm, and flanking notches at the edge portion of said movable mask to define an orientation for the horizon line of a face mask to be placed on the forward portion of said movable mask.

(References on following page)

References Cited by the Examiner

UNITED STATES PATENTS

| | | | |
|---|---|---|---|
| 1,897,446 | 2/33 | Stimpson | 116—129 |
| 1,913,201 | 6/33 | Haven | 116—136.5 |
| 2,128,956 | 9/38 | Moss | 33—204 |
| 2,264,726 | 12/41 | Stickney | 116—136.5 |
| 2,415,707 | 2/47 | Savage | 33—204 |
| 2,504,114 | 4/50 | Martino | 33—204.2 X |
| 2,553,309 | 5/51 | Gabrielson et al. | 33—204.2 |
| 2,585,961 | 2/52 | Norquist | 29—424 |
| 2,869,852 | 1/59 | Wallach | 116—136.5 X |
| 2,991,548 | 7/61 | Henry | 29—424 |
| 3,032,857 | 5/62 | Lyon | 29—521 |
| 3,114,429 | 12/63 | Miner | 181—31.1 |
| 3,138,137 | 6/64 | Hubner | 116—136.5 |

FOREIGN PATENTS

| | | |
|---|---|---|
| 1,205,406 | 8/59 | France. |
| 623,078 | 5/49 | Great Britain. |

ISAAC LISANN, *Primary Examiner.*